United States Patent
Wong et al.

(10) Patent No.: US 7,885,388 B2
(45) Date of Patent: Feb. 8, 2011

(54) METHOD AND APPARATUS FOR INITIATING COMMUNICATION VIA A MULTI-MODE SYSTEM IN A VEHICLE

(75) Inventors: William K. Wong, Rochester Hills, MI (US); Christopher L. Oesterling, Troy, MI (US); Julianne Petschke, Shelby Township, MI (US); Christopher J. Kearney, Tarpon Springs, FL (US)

(73) Assignee: General Motors LLC, Detroit, MI (US)

(*) Notice: Subject to any disclaimer, the term of this patent is extended or adjusted under 35 U.S.C. 154(b) by 1422 days.

(21) Appl. No.: 11/333,654

(22) Filed: Jan. 17, 2006

(65) Prior Publication Data

US 2007/0167200 A1  Jul. 19, 2007

(51) Int. Cl.
*H04M 11/00* (2006.01)
(52) U.S. Cl. .......................................... 379/52
(58) Field of Classification Search .................... 379/52; 455/575.9, 569.2, 556.1, 557
See application file for complete search history.

(56) References Cited

U.S. PATENT DOCUMENTS

| 3,760,362 | A | 9/1973 | Copland et al. |
| 6,628,967 | B1 | 9/2003 | Yue |
| 6,853,910 | B1 | 2/2005 | Oesterling et al. |
| 2005/0277440 | A1* | 12/2005 | Van Bosch et al. ............ 379/52 |

OTHER PUBLICATIONS

U.S. Appl. No. 11/206,957, filed Aug. 18, 2005, Oesterling et al.

\* cited by examiner

*Primary Examiner*—Stella L Woo
(74) *Attorney, Agent, or Firm*—Dierker & Associates, P.C.

(57) ABSTRACT

A system and method for initiating and realizing communication via a multi-mode system is disclosed. The method and system include realizing a preferred mode of communication. A signal indicating the preferred mode of communication is transmitted and followed by a response signal in the preferred mode. In response, the multi-mode system is adapted to provide for communication in the preferred mode.

20 Claims, 2 Drawing Sheets

METHOD AND APPARATUS FOR INITIATING COMMUNICATION VIA A MULTI-MODE SYSTEM IN A VEHICLE

TECHNICAL FIELD

The present disclosure relates generally to initializing communication, and more particularly to initializing communication via a multi-mode communication system.

BACKGROUND

Several modes of communication are currently employed to accommodate users/operators who are either hearing impaired (deaf or having a hearing handicap) or speech impaired (having an inability to speak or a speaking handicap). Common modes of communication are voice, TTY, hearing carryover (HCO), and voice carryover (VCO). The voice mode may be utilized for users/operators who are neither hearing impaired nor speech impaired. The TTY mode may be utilized when a user/operator is both hearing impaired and speech impaired. The HCO mode may be utilized when the user/operator is speech impaired but not hearing impaired, and VCO mode may be utilized when a user/operator is hearing impaired but not speech impaired.

In an existing device, when initiating a call from a TTY equipped vehicle, it is assumed that both the vehicle and the call recipient are in TTY mode. There is generally no verification from the call recipient that the call is actually connected or that the communication device has been adapted for communication in TTY mode. In this existing device, a twenty-second call set-up timer may be utilized to allow both the call initiator and the call recipient time to adapt the communication devices to TTY mode after a connection is made. After the twenty-second call set-up time expires, data is transmitted in TTY mode without a connection verification, assuming that the operators have correctly adjusted the mode of their communication devices.

While the above system functions adequately in many instances, it would yet be desirable to provide an improved multi-mode communication system suitable for users/operators with special needs, such as hearing and/or speech impaired users/operators, which may substantially eliminate the need for a call set-up time and may provide verification of connection and mode.

SUMMARY

The present disclosure provides a system and method for initiating and realizing communication via a multi-mode system. The method and system include realizing a preferred mode of communication, transmitting a signal indicative of the preferred mode, transmitting a notification of receipt of the signal, and adapting the multi-mode system to provide for communication in the preferred mode.

BRIEF DESCRIPTION OF THE DRAWINGS

Objects, features and advantages of examples of the present disclosure may become apparent by reference to the following detailed description and drawings, in which like reference numerals correspond to similar, though not necessarily identical components. For the sake of brevity, reference numerals having a previously described function may not necessarily be described in connection with other drawings in which they appear.

DETAILED DESCRIPTION

Figure 1:
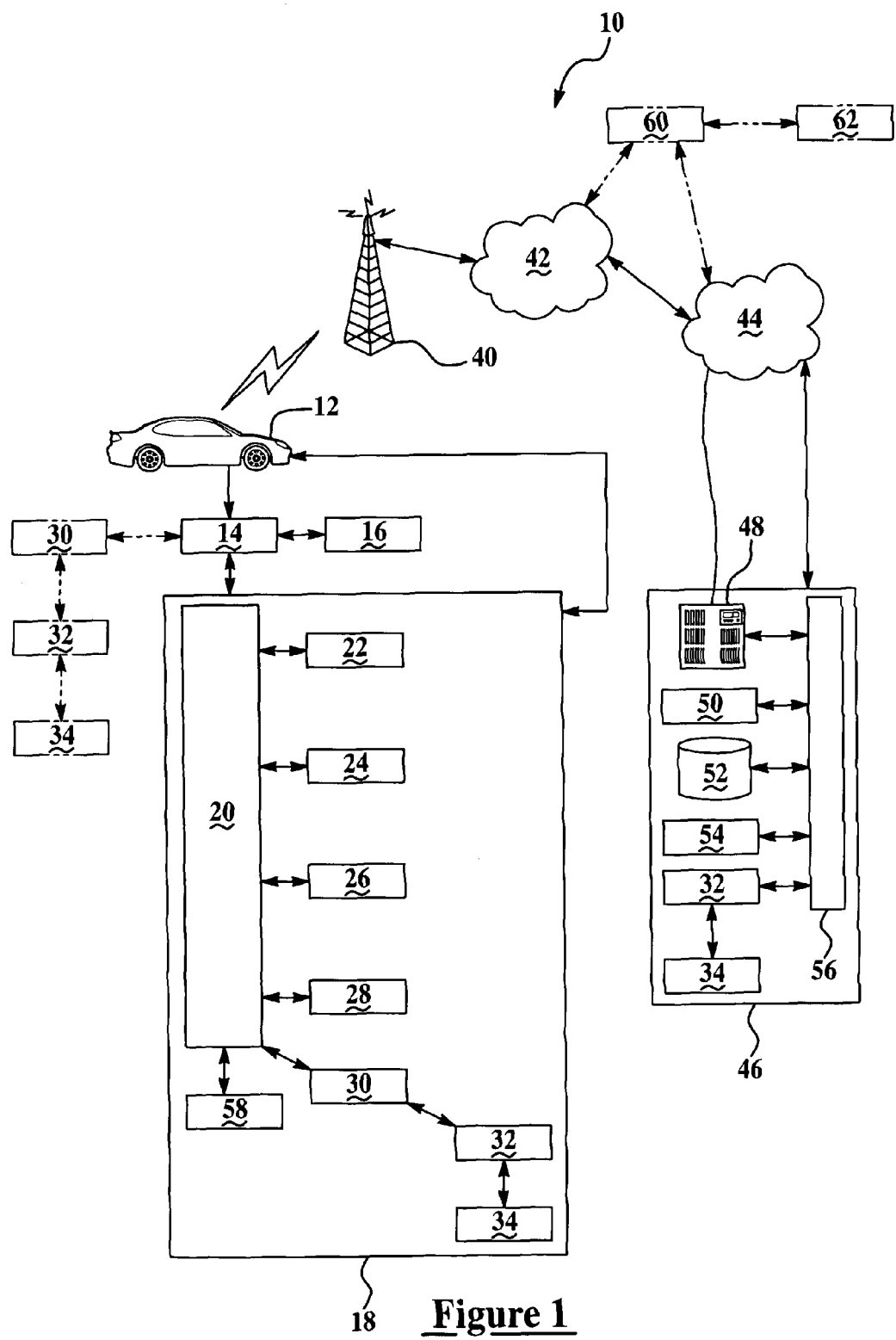
FIG. 1 is a schematic diagram depicting an example of a multi-mode communication system.

Example(s) of the system and method disclosed herein advantageously allow hearing impaired (e.g. those who are deaf or hard of hearing) and/or speech impaired (e.g. those who have an inability or difficulty speaking) users/operators to more effectively utilize a multi-mode communication system. The system and method herein include a modem (discussed further below) which advantageously allows for automated functionality with respect to mode synchronization and/or connection verification.

A method for initiating communication via a multi-mode system in a vehicle is disclosed herein. The method includes realizing a preferred mode of communication, transmitting a signal indicative of the preferred mode of communication via a two-way radio frequency communication system, and receiving notification of receipt of the signal. The method may further include adapting the multi-mode system to permit communication in the preferred mode of communication. It is to be understood that communication may be initiated from a multitude of locations, non-limitative examples of which include the vehicle, a different vehicle(s), a call center, or a third party. A third party may be any person or device in operative communication with the multi-mode system.

The method may be initiated from any device adapted to perform at least one of the functions described herein. The device may be portable (or mobile), stationary, or permanently fixed. A non-limitative example of a portable device may be one located at least partially within a vehicle, and a non-limitative example of a stationary or permanently fixed device may be one fixed in a call center.

It is to be understood that the preferred mode of communication may be a mode that provides for improved or simplified communication. A preferred mode of communication may be particularly useful for users/operators with special needs. Non-limitative examples of special needs users/operators include those who are hearing impaired and/or are speech impaired.

Realizing the preferred mode of communication may be achieved via any recognizable means of input. As a non-limitative example, a user may input/indicate intent of the preferred mode on a user interface panel (discussed further hereinbelow) via a button, switch, keypad, voice signal, and/or any other input device. The user interface panel may be operatively connected to the two-way radio frequency communication system by any suitable means, e.g. electronic switches. The user interface panel may be any device that facilitates interaction between the user/operator and the multi-mode system. Non-limitative examples of user interface panel displays include an LCD display, a driver information center display, a radio display, an arbitrary text device, a heads-up display, a vacuum fluorescent display, and combinations thereof. Furthermore, the user interface panel may facilitate selective switching between at least two modes.

The preferred mode of communication may be detected via a regular and periodic scan of the user interface panel by a TTY interface module processor (TIM) or via an interrupt communicated to a TIM, which prompts the TIM to scan the user interface panel. The interrupt may be regularly or randomly scheduled, may be a result of human input, or may be otherwise prompted. It is to be understood that realizing the preferred mode of communication may be achieved via at least one switch operatively connected to the two-way radio frequency communication system wherein the switch(es) are operatively responsive to user intent indicated by the user interface panel.

The signal indicative of the preferred mode of communication may be embodied in any form that may be transmitted via a two-way radio frequency communication system. A non-limitative example of a signal indicative of the preferred mode is a Baudot tone encoded with an indication of the preferred mode. It is to be understood that as used herein, "a Baudot tone" and "Baudot tones" are used interchangeably and may include a single Baudot tone or a combination of two or more Baudot tones. Baudot is a telecommunications protocol, employing 5 bit FSK (Frequency Shift Key) and a mode character to shift from letters to numbers. The baud rate is, for example, 45.45, which allows for a typing speed of no greater than 60 words per minute. Baudot does not use any error correction. It is also half duplex: users alternate turns, with no simultaneous typing. In the Baudot format, transmitted tones include a mark tone of 1,400 Hz and a space tone of 1,800 Hz. Serial sequences of marks and spaces provide five-bit binary numbers representing a limited set of characters, including letters of the alphabet, numerical digits, punctuation marks, and space characters.

Signal receipt notification may be embodied in any form that informs the user that his request for communication in a preferred mode was received. Non-limitative examples of forms of notification include a visual cue (ex. a light or a visual display) and an audible cue. An audible cue may be generated from a device in operative communication with the pre-existing vehicle audio system, such as amplifiers or speakers, or from a stand-alone system.

Notification of receipt of the signal may also include verification of a connection for communication between the user and the call recipient and/or verification of the preferred mode. In one embodiment of the system and methods described herein, the signal receipt notification may provide confirmation that the connection is adapted for the preferred mode of communication.

It is to be understood that a multi-mode communication system includes systems capable of transmitting communication in two or more modes. Non-limitative examples of modes of communication include voice, TTY, hearing carry-over (HCO), voice carryover (VCO), and/or the like.

Each mode of communication provides for communication in a particular form and may satisfy special needs of users/operators. Voice mode may be best adapted for users/operators who have neither a speaking nor hearing handicap. Voice mode is a configuration where audio inputs and outputs are used in the default condition. In a non-limiting example of voice mode, vehicle audio inputs are received by an in-vehicle microphone, and audio outputs are directed to the vehicle audio system (such as an in-vehicle amplifier and/or speakers). TTY mode provides that all audio inputs and outputs are directed to a TTY device. As such, TTY mode may be best adapted for users/operators who have both speaking and hearing handicaps. HCO mode provides that the audio output channel remains connected to the vehicle audio system so the user can hear incoming messages, but the audio input channel is disconnected from the microphone and redirected to a TTY device. As such, HCO mode may be best adapted for a user who is unable or has difficulty speaking but is able to hear. VCO mode users may be deaf or have difficulty hearing but are able to speak. VCO mode provides that the audio output channel is redirected to a TTY device enabling the user to see incoming messages and the audio input channel remains connected to the vehicle microphone.

A system for initiating communication via a multi-mode system in a vehicle is also described herein. The system includes a vehicle communications processor (VCP) operatively connected to the multi-mode system and a user interface panel operatively connected to the VCP. The user interface panel is adapted to receive indication of user intent regarding a preferred mode of communication. The system also includes a TTY interface module processor (TIM) operatively connected to the user interface panel, and a modem in operative communication with the VCP and the TIM.

The TIM is adapted to scan the user interface panel to detect the preferred mode of communication. The modem is adapted to selectively transmit a signal from the TIM to the VCP wherein the signal is indicative of the preferred mode of communication. The modem is further adapted to selectively transmit a response signal by the VCP to the TIM acknowledging receipt of the request for communication in the preferred mode and/or connection verification. The response signal may be transmitted in the form of the preferred mode. It is to be understood that, in an embodiment, at least one function of the system may be adapted to be selectively controlled via a signal originating from outside the vehicle and received by the system.

It is to be understood that the VCP may transmit the signal received from the TIM indicative of the preferred mode of communication to a call center. Furthermore, the signal generated by the call center and received by the VCP indicates acknowledgment of the preferred mode of communication and/or connection verification. Additionally, upon receipt of the signal generated by the call center, the modem may synchronize the multi-mode system to provide for communication between the multi-mode system and the call center in the preferred mode of communication. In an embodiment, the modem is adapted to transmit and receive signals automatically.

It is also to be understood that, upon receiving the indication of user intent regarding the preferred mode of communication at the user interface panel, at least one switch, responsive to the indication, is adapted to selectively switch between the modes. The modes of the multi-mode system may be selected from voice, TTY, hearing carryover, and voice carryover.

Also described herein is a method for realizing a preferred mode of communication from a multi-mode communication system in a vehicle. The method includes receiving a signal via a two-way modem wherein the signal is indicative of the preferred mode of communication, transmitting a response signal to the modem in the preferred mode of communication, and adapting the multi-mode communication system to provide for communication in the preferred mode.

Referring now to FIG. 1, there is depicted a schematic diagram of an embodiment(s) of a multi-mode communication system in accordance with the system and methods described herein. The system 10 includes a vehicle 12, a vehicle communications network 14, a telematics unit 18, a TTY interface module (TIM) 30, a user interface panel 32, a TTY unit 34, a two-way radio frequency communication system (including, but not limited to, one or more wireless carrier systems 40, one or more communication networks 42, and/or one or more land networks 44), and one or more call centers 46. In one embodiment, vehicle 12 is a mobile vehicle with suitable hardware and software for transmitting and receiving voice and data communications. It is to be understood that system 10 may include additional components suitable for use in telematics units 18.

In an embodiment, via vehicle communications network 14, the vehicle 12 may send signals from the telematics unit 18 to various units of equipment and systems 16 within the vehicle 12 to perform various functions, such as unlocking a door, executing personal comfort settings, and/or the like. In facilitating interaction among the various communications and electronic modules, vehicle communications network 14 may utilize interfaces such as controller area network (CAN), ISO standard 11989 for high speed applications, ISO standard 11519 for lower speed applications, and/or Society of Automotive Engineers (SAE) standard J1850 for high speed and lower speed applications.

The telematics unit 18 may send and receive radio transmissions from wireless carrier system 40. In an embodiment, wireless carrier system 40 may be a cellular telephone system and/or any other suitable system for transmitting signals between the vehicle 12 and communications network 42. Further, the wireless carrier system 40 may include a cellular communication transceiver, a satellite communications transceiver, a wireless computer network transceiver (a non-limitative example of which includes a Wide Area Network (WAN) transceiver), and/or combinations thereof.

Telematics unit 18 may include a processor 20 operatively coupled to a wireless modem 22, a location detection system (a non-limitative example of which is a global positioning system (GPS)), an in-vehicle memory, a microphone 28, one or more speakers 26, an embedded or in-vehicle TTY compatible mobile phone 24, TIM 30, user interface panel 32, TTY unit 34, and/or a short-range wireless communication network (e.g. a Bluetooth® unit). In an alternate embodiment, the TIM 30 (operatively coupled to the user interface panel 32 and the TTY device 34) may be adapted to communicate directly with the vehicle communications network 14, which is coupled to the telematics unit 18.

The TTY unit 34 is a telecommunications device for the hearing-impaired user. The TTY unit 34 may include external components, such as a keyboard, display, and/or the like, used, for example, to input information and/or to alert a hearing-impaired user of an incoming call and/or an incoming navigation route command.

It is to be understood that the telematics unit 18 may be implemented without one or more of the above listed components, such as, for example, speakers 26. Yet further, it is to be understood that the speaker 26 may be a component of the vehicle audio system, which may accept audio and other signals from the telematics unit 18. It is to be further understood that telematics unit 18 may include additional components and functionality as desired for a particular end use.

Processor 20 may be a micro controller, a controller, a microprocessor, a host processor, and/or a vehicle communications processor (VCP). In another embodiment, processor 20 may be an application specific integrated circuit (ASIC). Alternatively, processor 20 may be a processor working in conjunction with a central processing unit (CPU) performing the function of a general-purpose processor.

In-vehicle mobile phone 24 may be a TTY compatible cellular type phone, such as, for example an analog, digital, dual-mode, dual-band, multi-mode and/or multi-band cellular phone.

Associated with processor 20 may be a real time clock (RTC) providing accurate date and time information to the telematics unit hardware and software components that may require date and time information. In one embodiment, date and time information may be requested from the RTC by other telematics unit components. In other embodiments, the RTC may provide date and time information periodically, such as, for example, every ten milliseconds.

Processor 20 may execute various computer programs that interact with operational modes of electronic and mechanical systems within the vehicle 12. It is to be understood that processor 20 controls communication (e.g. call signals) between telematics unit 18, wireless carrier system 40, and call center 46.

Further, processor 20 may generate and accept digital signals transmitted between the telematics unit 18 and the vehicle communication network 14, which is connected to various electronic modules in the vehicle 12. In one embodiment, these digital signals activate the programming mode and operation modes within the electronic modules, as well as provide for data transfer between the electronic modules. In another embodiment, certain signals from processor 20 may be translated into vibrations and/or visual alarms.

It is to be understood that software 58 may be associated with processor 20 for monitoring and/or recording the incoming caller utterances/transmissions.

The communications network 42 may include services from one or more mobile telephone switching offices and/or wireless networks. Communications network 42 connects wireless carrier system 40 to land network 44. Communications network 42 may be any suitable system or collection of systems for connecting the wireless carrier system 40 to the vehicle 12 and the land network 44.

The land network 44 connects the communications network 40 to the call center 46. In one embodiment, land network 44 is a public switched telephone network (PSTN). In another embodiment, land network 44 is an Internet Protocol (IP) network. In still other embodiments, land network 44 is a wired network, an optical network, a fiber network, another wireless network, and/or any combinations thereof. The land network 44 may be connected to one or more landline telephones. It is to be understood that the communications network 42 and the land network 44 connect the wireless carrier system 40 to the call center 46.

Call center 46 contains one or more data switches 48, one or more communication services managers 50, one or more communication services databases 52 containing subscriber profile records and/or subscriber information, one or more communication services advisors 54, one or more network systems 56, a user interface panel 32, and a TTY device 34. The call center 46 does not require a TIM 30, however, in an embodiment, call center 46 does include a TIM 30.

In an embodiment, an application program running on a computer in call center 46 interprets and interactively presents TTY data received from the TIM 30 located in vehicle 12. Additionally, the application program may take advisor 54 input, and transform the input to a TTY-compatible form. The application program may then send the transformed, TTY-compatible input from the advisor 54 to the vehicle TIM 30 (via communication services manager(s) 50 and switch 48).

Switch 48 of call center 46 connects to land network 44. Switch 48 transmits voice or data transmissions from call center 46, and receives voice or data transmissions from telematics unit 18 in vehicle 12 through wireless carrier system 40, communications network 42, and (optionally) land network 44. Switch 48 receives data transmissions from, or sends data transmissions to one or more communication service managers 50 via one or more network systems 56.

Call center 46 may contain one or more service advisors 54. In one embodiment, service advisor 54 may be human. In another embodiment, service advisor 54 may be an automaton(s).

In an alternate embodiment, the vehicle 12 communicates directly with another phone 62 in any third party location (stationary or mobile) via a TTY relay service 60 in operative communication with communications network 42, and/or land network 44. In one non-limitative embodiment, phone 62 is a multi-mode phone. It is to be understood that such a multi-mode phone may be any communications device adapted to operate in at least two modes, such as, for example, a TTY-enabled device.

Figure 2:
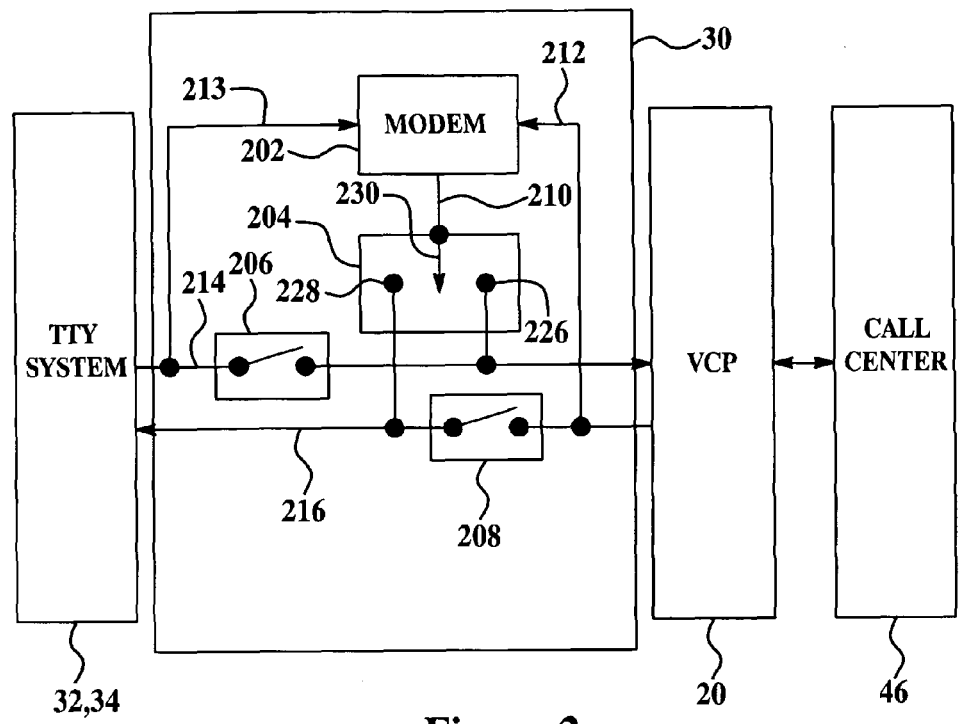
FIG. 2 is a schematic diagram depicting sub-components of an example of a multi-mode communication system.

Referring now to FIG. 2, in an example of the multi-mode system and methods described herein, the TTY system including user interface panel 32 and TTY device 34 is operatively connected to processor 20 (which is a vehicle communications processor (VCP) in this embodiment), and ultimately to call center 46, via TTY Interface Module (TIM) 30.

When a preferred mode is input via the user interface panel 32, a signal, such as a Baudot tone encoded with a request for the preferred mode, is carried by signal line 213 to modem 202. Upon recognition and analysis of that signal, a signal is generated in the modem 202, and is transmitted via control line 210 to relay 204, whereby relay contact arm 230 on relay 204 momentarily makes contact with relay contact 226 to transmit the signal to the VCP 20 and the call center 46. For example, if the preferred mode is changed from TTY to voice via an input to the user interface panel 32, a Baudot tone encoded with a request for "voice" will be sent from the modem 202 to the VCP 20 and, ultimately, to the call center 46 (or phone 62 in an alternate embodiment). After the Baudot tone is transmitted through relay 204, the contact arm 230 returns to the open position, which position is illustrated in FIG. 2. Relays 204, 206, and 208 are the relays that switch the modes, examples of which include voice, TTY, VCO, and HCO.

In the example illustrated in FIG. 2, when relay 206 is closed in response to a signal carried by signal line 214, the TTY system 32, 34 can transmit a signal(s) to the VCP 20 and call center 46. When relay 208 is closed, the TTY system 32, 34 can receive a signal(s) from the modem 202 and/or VCP 20 and call center 46.

After receiving the request for communication in the preferred mode from the modem 202, call center 46 (or a third party in an alternate example) adjusts its mode to correspond with the preferred mode, and generates a response signal. The response signal, which may carry data in the preferred mode, is transmitted from call center 46 to VCP 20 and to the modem 202 via signal line 212. Upon detection of the response signal by the modem 202, the modem 202 switches relay contact arm 230 to contact relay contact 228, allowing data to pass to the TTY system 32, 34 via signal line 216.

Figure 3:
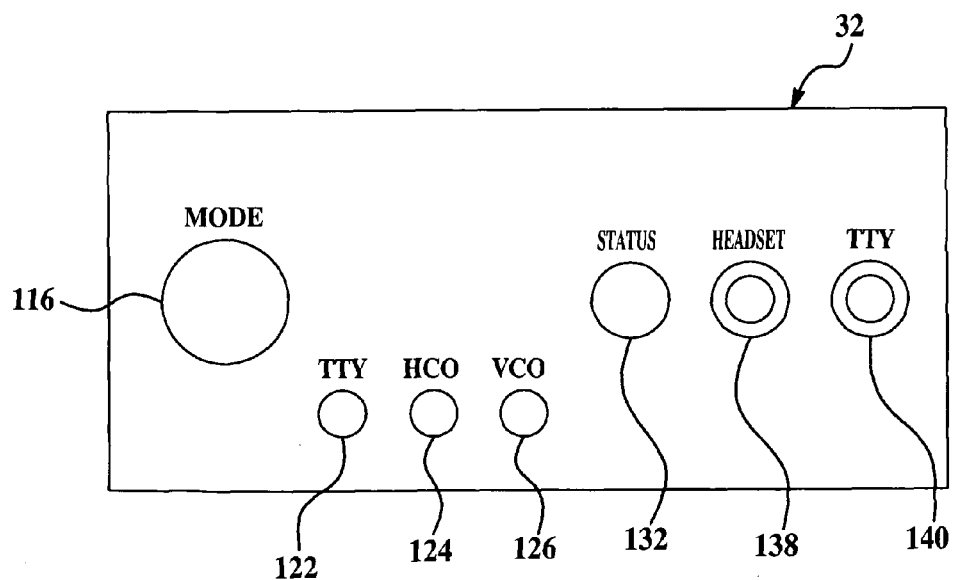
FIG. 3 is a semi-schematic diagram depicting an example of a user interface panel.

Referring now to FIG. 3, an example of a user interface panel 32 is depicted. In this embodiment, the preferred mode of communication is realized by pressing a "Mode" button 116 on the user interface panel 32 to cycle through the available modes of communication and thereby indicate intent of the preferred mode. Indication of the preferred mode may be confirmed via any suitable means, a non-limiting example of which includes illuminated LEDs 122, 124, 126 on the face of the user interface panel 32, whereby no LEDs 122, 124, 126 are illuminated if the mode is "voice," and one or more LEDs 122, 124, 126 are illuminated to indicate various other modes of communication. It is to be understood that any sensory cue, for example, an audio cue or a visual display adapted to indicate the selected mode, may replace or supplement LEDs 122, 124, 126.

The user interface panel 32 may include other features, such as, for example, input and/or device indicators. In one embodiment, the user interface panel 32 may include an LED 132 indicating the system status. The status LED 132 may illuminate or blink when the TTY device 34, the TIM 30, and/or the VCP 20 are "busy" or processing. In an example of another embodiment, the user interface panel 32 may include inputs 138, 140 for auxiliary devices. For example, the user interface panel 32 may include a headset input 138, whereby a headset may operatively connect to the user interface panel 32, and/or a TTY input 140, whereby an auxiliary TTY device 34 may be operatively connected to the user interface panel 32.

It is to be understood that the terms "attached/attaches/attaching to," "connected/connects/connecting to," and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "attached to" or "connected/ing to" the other component is somehow in operative communication with the other component (notwithstanding the presence of one or more additional components therebetween). For example, the VCP 20 is considered to be connected to the call center 46 although the wireless carrier system 40 may be disposed therebetween.

Further, it is to be understood that, as defined herein, a user may include vehicle operators and/or passengers.

While several embodiments have been described in detail, it will be apparent to those skilled in the art that the disclosed embodiments may be modified. Therefore, the foregoing description is to be considered exemplary rather than limiting.

The invention claimed is:

1. A method for initiating communication via a multi-mode system in a vehicle, the method comprising:
   realizing a preferred mode of communication, the preferred mode of communication being selected by a user prior to the initiating of the communication;
   transmitting a signal indicative of the preferred mode of communication via a two-way radio frequency communication system from the vehicle to a call center; and
   receiving, via the two-way radio frequency communication system, notification of receipt of the signal from the call center.

2. The method of claim 1, further comprising adapting the multi-mode system to permit communication in the preferred mode of communication.

3. The method of claim 1 wherein communication is initiated from one of the vehicle, an other vehicle, a call center, or a third party.

4. The method of claim 1 wherein the notification further includes at least one of verification of a connection or verification of the preferred mode.

5. The method of claim 1 wherein a mode of the multi-mode system is selected from voice, TTY, hearing carryover, and voice carryover.

6. The method of claim 1 wherein realizing the preferred mode of communication is achieved via at least one switch operatively connected to the two-way radio frequency communication system, the at least one switch operatively responsive to user intent indicated by a user interface panel.

7. The method of claim 6 wherein the user interface panel includes a display selected from LCD displays, driver information center displays, radio displays, arbitrary text devices, heads-up displays, vacuum fluorescent displays, and combinations thereof.

8. The method of claim 6 wherein the preferred mode of communication is detected via a periodic scan of the user interface panel by a TTY Interface Module (TIM) processor.

9. The method of claim 6 wherein an interrupt communicated to a TTY Interface Module processor (TIM) prompts the TIM to scan the user interface panel to realize the preferred mode of communication.

10. The method of claim 1 wherein the signal is transmitted in the form of a Baudot tone.

11. A system for initiating communication via a multi-mode system in a vehicle, the system comprising:
   a vehicle communications processor (VCP) operatively connected to the multi-mode system;
   a user interface panel operatively connected to the VCP and adapted to receive indication of user intent regarding a preferred mode of communication prior to the initiating of the communication;
   a TTY Interface Module processor (TIM) operatively connected to and adapted to scan the user interface panel to detect the preferred mode of communication;
   a modem in operative communication with the VCP and with the TIM, the modem adapted to selectively transmit to the VCP a signal received from the TIM indicative of the preferred mode of communication and to selectively transmit to the multi-mode system a signal received by the VCP indicating at least one of acknowledgment of the preferred mode of communication or connection verification; and
   a call center configured to i) receive a transmission of the signal indicative of the preferred mode of communication from the VCP, and ii) generate an other signal indicating at least one of acknowledgment of the preferred mode of communication or connection verification.

12. The system of claim 11 wherein the other signal is received by the VCP from the call center.

13. The system of claim 11 wherein, upon receipt of the signal generated by the call center, the modem synchronizes the multi-mode system to provide for communication between the multi-mode system and the call center in the preferred mode of communication.

14. The system of claim 11 wherein, upon receiving the indication of user intent regarding the preferred mode of communication at the user interface panel, at least one switch, responsive to the indication, is adapted to selectively switch between at least two modes.

15. The system of claim 14 wherein the modes of the multi-mode system are selected from voice, TTY, hearing carryover, and voice carryover.

16. The system of claim 11 wherein at least one function of the system is adapted to be selectively controlled via a signal originating from outside the vehicle and received by the system.

17. The system of claim 11 wherein the user interface panel includes a display selected from LCD displays, driver information center displays, radio displays, arbitrary text devices, heads-up displays, vacuum fluorescent displays, and combinations thereof.

18. The system of claim 11 wherein the modem is adapted to transmit and receive the signals automatically.

19. A method of realizing a preferred mode of communication from a multi-mode communication system in a vehicle, the method comprising:
   prior to initiating communication, receiving a signal at a call center from the vehicle via a two-way modem, the signal being indicative of the preferred mode of communication;
   transmitting, from the call center, a response signal in the preferred mode of communication to the modem; and
   adapting the multi-mode communication system to provide for communication in the preferred mode of communication.

20. The method of claim 19 wherein a mode of the multi-mode system is selected from voice, TTY, hearing carryover, and voice carryover.

* * * * *